United States Patent [19]

Kuhnle et al.

[11] 4,350,217
[45] Sep. 21, 1982

[54] BALANCE ARM FOR FLAT WEIGHING MACHINES

[75] Inventors: Ernst Kuhnle; Josef Schwarz, both of Balingen, Fed. Rep. of Germany

[73] Assignee: Bizerba-Werke Wilhelm Kraut KG, Balingen, Fed. Rep. of Germany

[21] Appl. No.: 201,812

[22] Filed: Oct. 29, 1980

[30] Foreign Application Priority Data

Nov. 2, 1979 [DE] Fed. Rep. of Germany ....... 2944126

[51] Int. Cl.³ ...................... G01G 21/14; G01G 21/04
[52] U.S. Cl. .............................. 177/246; 177/DIG. 9; 308/2 R
[58] Field of Search ................. 177/246, DIG. 9, 261; 308/2 R

[56] References Cited

U.S. PATENT DOCUMENTS 1,415,508  5/1922  Bandoly .......................... 177/246 X
3,465,838  9/1969  Kienzle .......................... 308/2 R X

FOREIGN PATENT DOCUMENTS 254226  10/1962  Netherlands ................ 177/DIG. 9

*Primary Examiner*—Joseph W. Hartary
*Attorney, Agent, or Firm*—Shenier & O'Connor

[57] ABSTRACT

A balance arm for flat weighing machines has a rigid frame formed by girder-section rails extending between side beams. A pair of knife-edges are attached to each rail to extend parallel to the longitudinal axis thereof with the sharp edges of each pair of knife-edges in alignment. The rails are secured to the side beams such that all the sharp edges lie in a common plane. The configuration of the rails enables all the knife-edges to be precision ground on a common grinding machine after attachment to the inside of the rails and before the side beams are attached to the rails.

4 Claims, 8 Drawing Figures

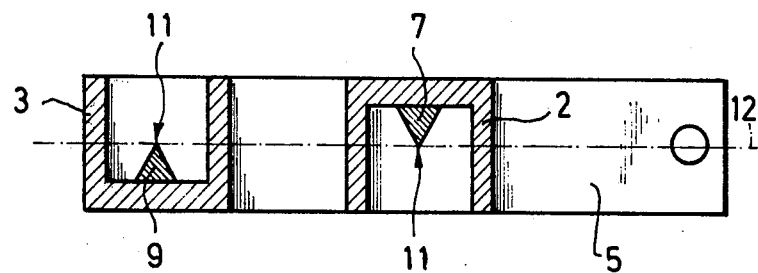
Fig. 2
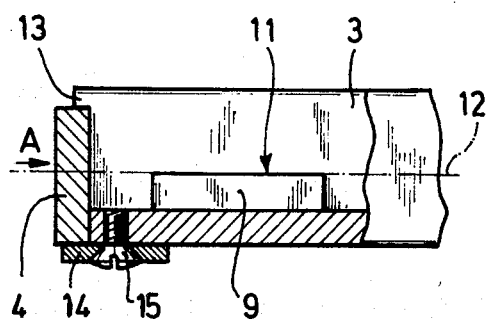 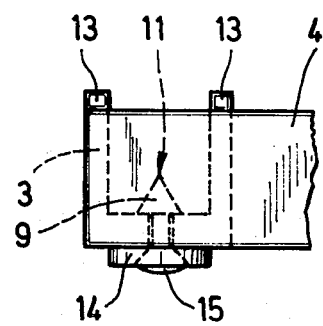
Fig. 3  Fig. 4
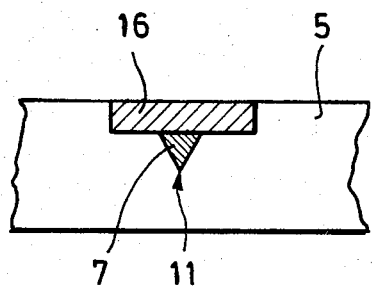 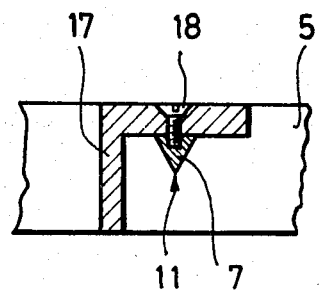
Fig. 5  Fig. 6

BALANCE ARM FOR FLAT WEIGHING MACHINES

BACKGROUND OF THE INVENTION

The present invention relates to a balance arm for flat weighing machines, in particular weighing machines for shops, having two pairs of knife-edges which are located on a rigid frame.

Weighing machines of high accuracy necessitate balance arms having the most complete alignment possible of the sharp edges of each pair of knife-edges, one pair of knife-edges usually forming the so-called main bearing or support bearing, whilst the sharp edges of another pair of knife-edges are load-carrying knife-edges and serve to introduce the force to be measured. In addition to the complete mutual alignment of the two sharp edges of one pair of knife-edges, it is also necessary that all sharp edges of the various pairs of knife-edges lie in a common plane.

This requirement is best satisfied, from the point of view of production engineering, by machining the sharp edges (or function lines) of the coarse knife-edges, or raw knife-edges, which have been attached to the balance arm, on a common grinding machine. By using the same grinding machine it is possible to ensure, by known techniques, that all sharp edges lie, parallel to each other, in a common plane. For example, the balance arm may be rotated through 180° during the grinding operation. Inadequate alignment would cause increased friction, which would manifest itself as inadequate mobility. Inadequate parallelism and inadequate location in a common plane would result in excessive errors in the case of so-called corner loading.

The precision-grinding, in common, of the knife-edges, located on a common balance arm, necessitates a special configuration of the balance arm, this configuration guaranteeing that each sharp edge can be ground along its entire length. In the main, two configurations of such a type are being employed in practice to date. The first known configuration relates to the so-called S-head arm, in which the knife-edges are attached to S-shaped arms with the sharp edges turned towards each other, in such a manner that they can be ground along their entire length. S-head arms of this type are, for example, described in "Waagen, Bau und Verwendung" (Weighing Machines, Construction and Use), Erwin Hess, 1963, pages 40 to 43. Having regard to the need for stiffness, S-shaped balance arms have the disadvantage of a relatively large assembly height and permit only relatively large distances between the two pairs of knife-edges. In the other balance arm configuration which is used in practice, a balance arm in the form of a frame, made, for example, from flat material, is provided with conical bores at the sides, into which knife-edges which have previously been ready-ground (so-called "pear knife-edges", for example) are pressed, by means of a conical extension, these knife-edges projecting laterally in the manner of a cantilever. Such an arrangement of knife-edges is described and illustrated in the above-mentioned publication, pages 43 to 45. Although this configuration certainly permits a comparatively low assembly height and small distances between the pairs of knife-edges, the advantageous common grinding of all pairs of knife-edges attached to the balance arm, along the entire length of the sharp edges, is nevertheless impossible. The bores for the knife-edges of each pair of knife-edges must be in precise mutual alignment, and the sharp edge must coincide as accurately as possible with the axis of the conical extension of the knife-edge. Considerable precision is accordingly necessary in producing the bores and knife-edges, without at the same time attaining the quality of the S-head arm, with regard to weighing technology.

It is an object of the invention to remedy the disadvantages described, and to provide a balance arm which is of flat construction and which permits short distances between the pairs of knife-edges.

SUMMARY OF THE INVENTION

According to the present invention there is provided a balance arm for flat weighing machines comprising two spaced side beams, at least two girder-section rails secured to said side beams to form a rigid frame, and a pair of knife-edges attached to each said rail such that each knife-edge extends parallel to the longitudinal axis of the respective rail, wherein each knife-edge has a sharp edge and the sharp edges of the knife-edges of each pair are in alignment, and wherein each rail is secured to the side beams such that the sharp edges of all the knife edges lie in a common plane.

BRIEF DESCRIPTION OF THE DRAWINGS

Embodiments of the present invention will hereinafter be described, by way of example, with reference to the accompanying drawings, in which:

FIG. 2 shows a section taken along the line 2—2 of FIG. 1,

FIGS. 3 and 4 show sections of a further embodiment of a balance arm, and

FIGS. 5 to 8 show cross-sectional views of different girder-section rails each having a knife-edge attached thereto.

DESCRIPTION OF THE PREFERRED EMBODIMENTS

Figure 1:
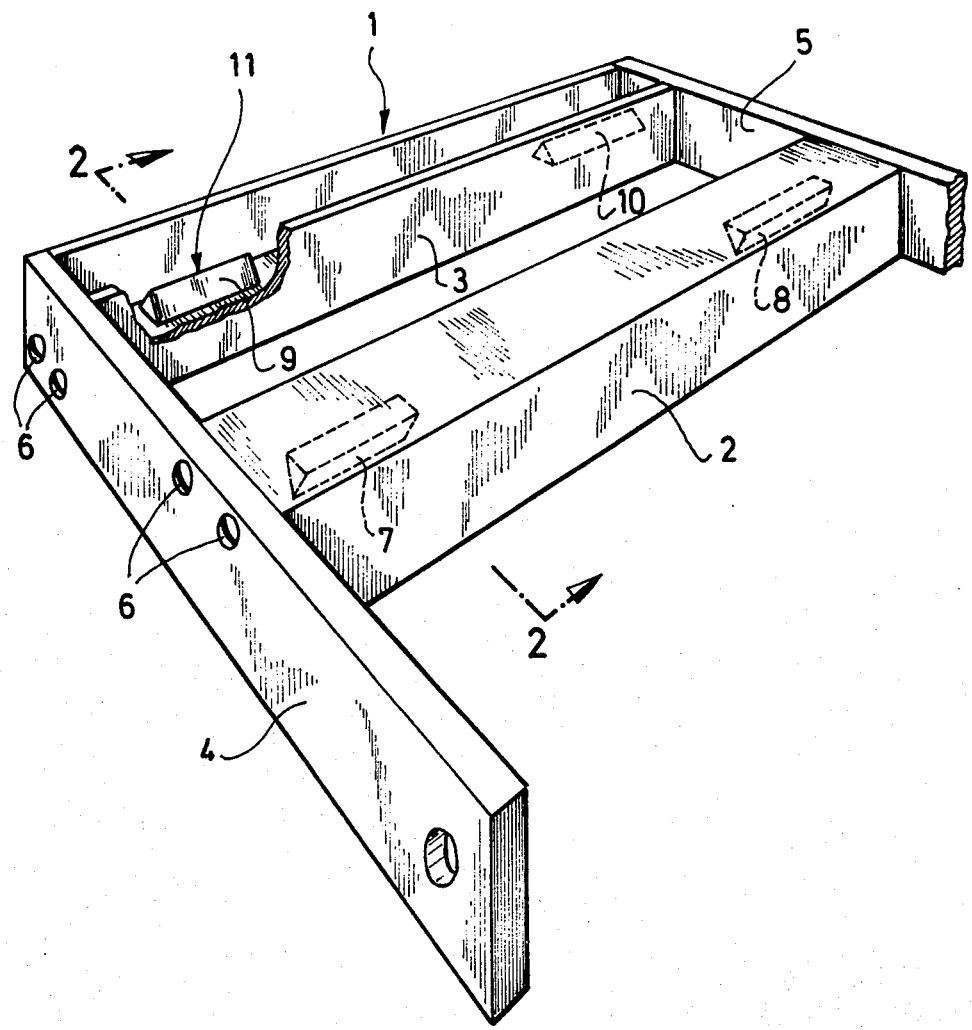
FIG. 1 shows a perspective view of a balance arm.

The balance arm shown in FIG. 1 comprises a rigid frame 1 made of two girder-section rails 2, 3 each having a U-shaped cross-section. The open end of each rail 2, 3 is securely joined to a respective side beam 4, 5 by means of screws 6. Each side beam 4, 5 is preferably in the form of a solid or a hollow planar member. The open side of the girder-section rail 2 faces downwardly whilst the open side of the girder-section rail 3 faces upwardly. Two knife-edges 7, 8 of a first pair of knife-edges are attached inside the girder-section rail 2 such that the sharp edge of each faces towards the open side of the rail 2. Two knife-edges 9, 10 of a second pair of knife-edges are attached inside the girder-section rail 3, the sharp edge 11 of each pointing towards the open side of the rail 3, that is, facing upwardly. In a weighing machine containing the frame 1 as a balance arm, the knife-edges 7, 8 act as the main knife-edges and the knife-edges 9, 10 act as the knife-edges for introducing the force to be measured.

In each case, the knife-edges 7, 8, 9, 10 are adhered, for example by glue, to the girder-section rails 2, 3, or are fixed to the rails by means of screws. As can be seen in FIG. 2, the dimensions of the girder-section rails 2, 3, of the knife-edges located therein, and of the side beams 4, 5, are chosen such that the function lines, or sharp edges 11 of all the knife-edges lie in a common plane 12, this plane advantageously being the median plane of the frame 1.

Each pair of knife-edges is located on a separate girder-section rail which has an open end. This arrangement enables the two knife-edges of each pair to be ground parallel to the longitudinal axis of the girder-section rails to thereby obtain sharp edges 11 which are in precise mutual alignment. The grinding can be effected along the entire length of the knife-edges, since the grinding disc can enter, and emerge from, the open end of the girder-section rail. At least two girder-section rails are then secured, as shown in FIGS. 1 and 2, between two side beams, by clamping, screwing, glueing, or the like. The rails are arranged to be mutually parallel at a predetermined distance from each other, and, in particular, are arranged such that the function lines, or sharp edges 11, lie in a common plane. As the girder-section rails 2, 3 can be manufactured in various lengths, without special production engineering effort, and as they can be positioned at any desired distance from each other, in particular at even a very small distance, and as the side beams 4, 5 can be chosen to be of any desired length, also without any large production engineering effort, extremely flat balance arms having the most diverse leverage ratios and suitable for weighing machines of different sizes, can be constructed in a most simple manner. Although balance arms of the type described are suitable mainly for weighing machines of small capacity, for example counter-top weighing machines, weighing machines of considerably higher capacity, up to 100 kg for example, can also be manufactured with these balance arms.

FIGS. 3 and 4 show partial sections of a further embodiment of a balance arm of the invention. In FIGS. 3 and 4, parts which correspond to parts shown in FIGS. 1 and 2 have been accorded the same reference numerals. In the embodiment shown in FIGS. 3 and 4 the girder-section rails 2, 3, of which only the section rail 3 is shown in FIGS. 3 and 4, each have a U-shaped cross-section and have projections 13 on their open side, by means of which projections the rails rest on the upper sides of the side beams 4, 5. (In FIGS. 3 and 4, only the side beam 4 is illustrated). The girder-section rails 2, 3 are clamped to the side beams 4, 5 by means of a respective washer 14 which spans the lower side of the girder-section rail and of the side beam. The washer 14 is brought into abutment with the lower side of the girder-section rail 3 by means of a screw 15, such that the side beam 4 is securely clamped between the projections 13 and the washer 14. It is also possible to attach one of the girder-section rails, for example the rail 3, to the side beams 4, 5 by means of screws 6 (as shown in FIG. 1), whilst the other girder-section rail 2 is joined to the side beams by clamping, in the manner shown in FIGS. 3 and 4.

In the embodiment shown in FIGS. 3 and 4, the knife-edges, attached inside the girder-section rails, are also dimensioned or ground so that the sharp edges lie in mutual alignment and in a common plane 12, which is preferably the median plane of the two side beams 4, 5. In order to ensure location of all the sharp edges 11 in the common plane 12, it is sufficient to form the projections 13 with appropriate precision, so that, after precise grinding-in of the sharp edges 11, the correct spacing of the sharp edges from the upper lower sides of the side beams is given by resting the projections 13 on the upper sides of the side beams 4, 5.

Further embodiments are represented in FIGS. 5 to 8. FIG. 5 shows a girder-section rail 16 of solid rectangular section secured to a side beam 5. The girder-section rail 16 could also be hollow. The knife-edge 7 is glued to the rail 16.

FIG. 6 shows a girder-section rail 17 of L-shaped section. The knife-edge 7 is attached to one of the arms of the rail 17 by means of a screw 18.

Figure 7:
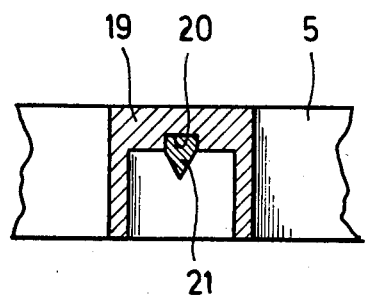

FIG. 7 shows a girder-section rail 19 having a U-shaped cross-section with a transverse web in which a groove 20 is formed. A knife-edge 21 is inset into the groove 20 and retained, for example, by glueing.

Figure 8:
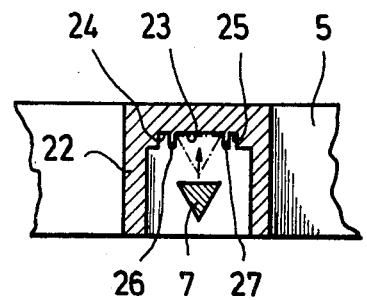

In the embodiment represented in FIG. 8, a girder-section rail 22, of U-shaped cross-section has three grooves 23, 24, 25 in its transverse web. The central groove 23 is comparatively wide and on each side thereof a respective narrower groove 24, 25 extends parallel thereto. Narrow ribs 26 and 27 are defined between the central groove 23 and each of the grooves 24, 25. To attach the knife-edge 7 inside the girder-section rail 2, the knife-edge 7 is inserted into the groove 23. The ribs 26, 27 are then peened-over, against the inclined sides of the knife-edge 7, thus securely joining the knife-edge to the girder-section rail. In addition to this peening operation, a glueing operation can also be performed.

It is also possible to design the girder-section rails and the knife-edges in one piece, for example from a section of appropriate form, this section including the sharp edge which is to be ground later.

The principal advantage of the present invention resides in the large extent to which the balance arm can be varied, with regard to its lever arm (distance between knife-edges) and longitudinal dimensions. It is possible, as in the case of a kit of modular parts, to manufacture the most diverse balance arms using the same components, these balance arms being always of flat construction.

We claim:

1. Balance arm for flat weighing machines comprising two spaced side beams, at least two girder section rails each having a U-shaped cross-section along its entire length and open ends, said U-shaped cross-section comprising a base and two spaced sides extending at right angles with respect to said base, the open ends of said rails being secured to said side beams by screw means to form a rigid frame, in which said rails are arranged in spaced parallel relation, and a pair of knife-edges attached to the base of each said rail between said sides such that each knife-edge extends parallel to the longitudinal axis of the respective rail, wherein each knife-edge has a sharp edge and the sharp edges of the knife-edges of each pair are in alignment, and wherein each rail is secured to the side beams such that the sharp edges of all the knife edges lie in a common plane.

2. Balance arm according to claim 1, wherein the girder-section rails carry projections which rest on a first surface of the side beams.

3. Balance arm according to claim 1, further comprising clamping means securing each girder-section rail against a second surface of a side beam opposite to said first surface, said clamping means including a washer arranged to be brought into abutment with the girder-section rail and said second surface of the side beam.

4. Balance arm according to claim 1, wherein a groove is provided in the base of each girder-section rail and wherein a respective knife-edge is received in said groove.

* * * * *